Oct. 6, 1931.  H. C. GENTRY  1,825,901
ROLLER DUMP BODY FOR TRUCKS
Filed April 6, 1929   3 Sheets-Sheet 1
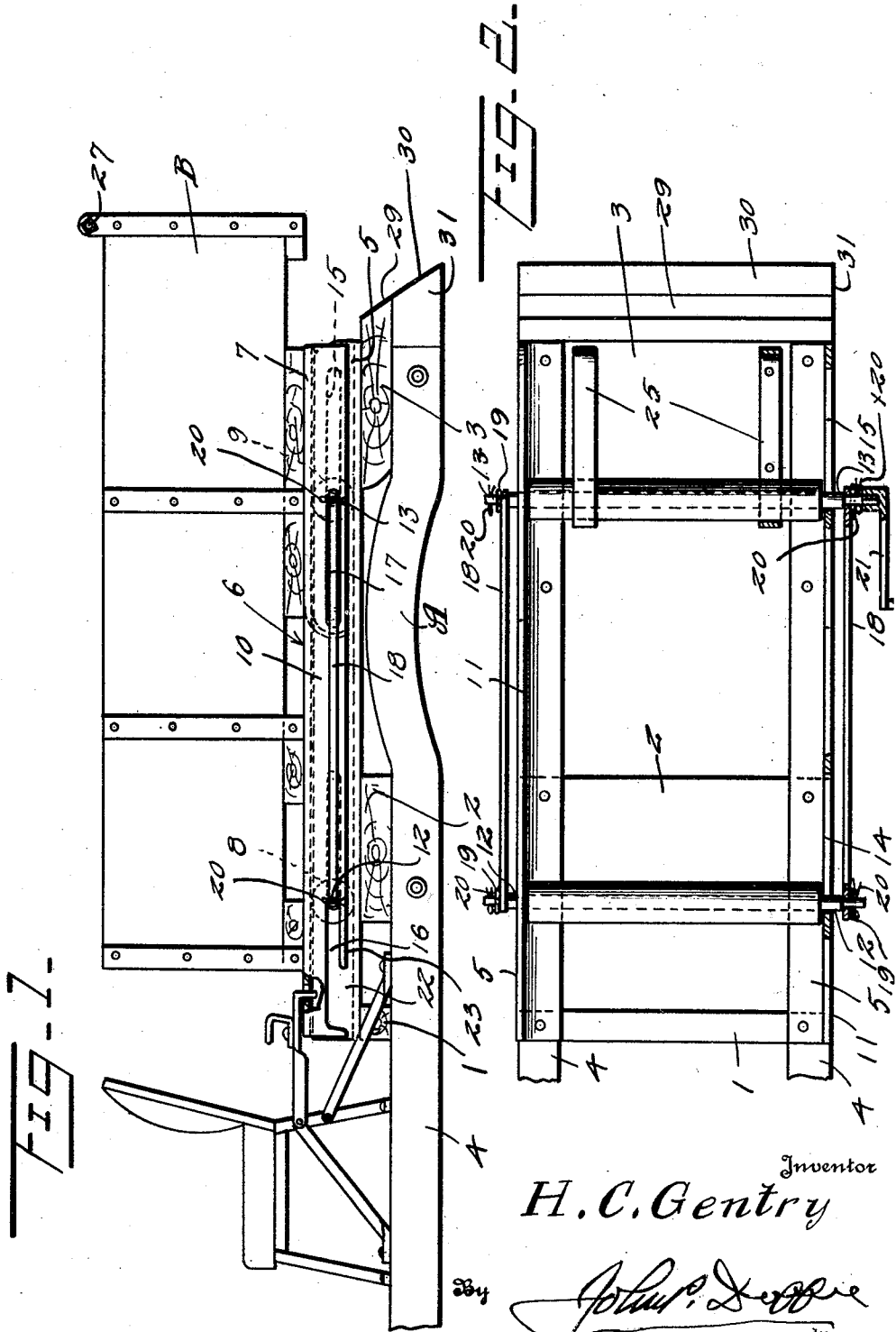
Inventor
H. C. Gentry
By
Attorney

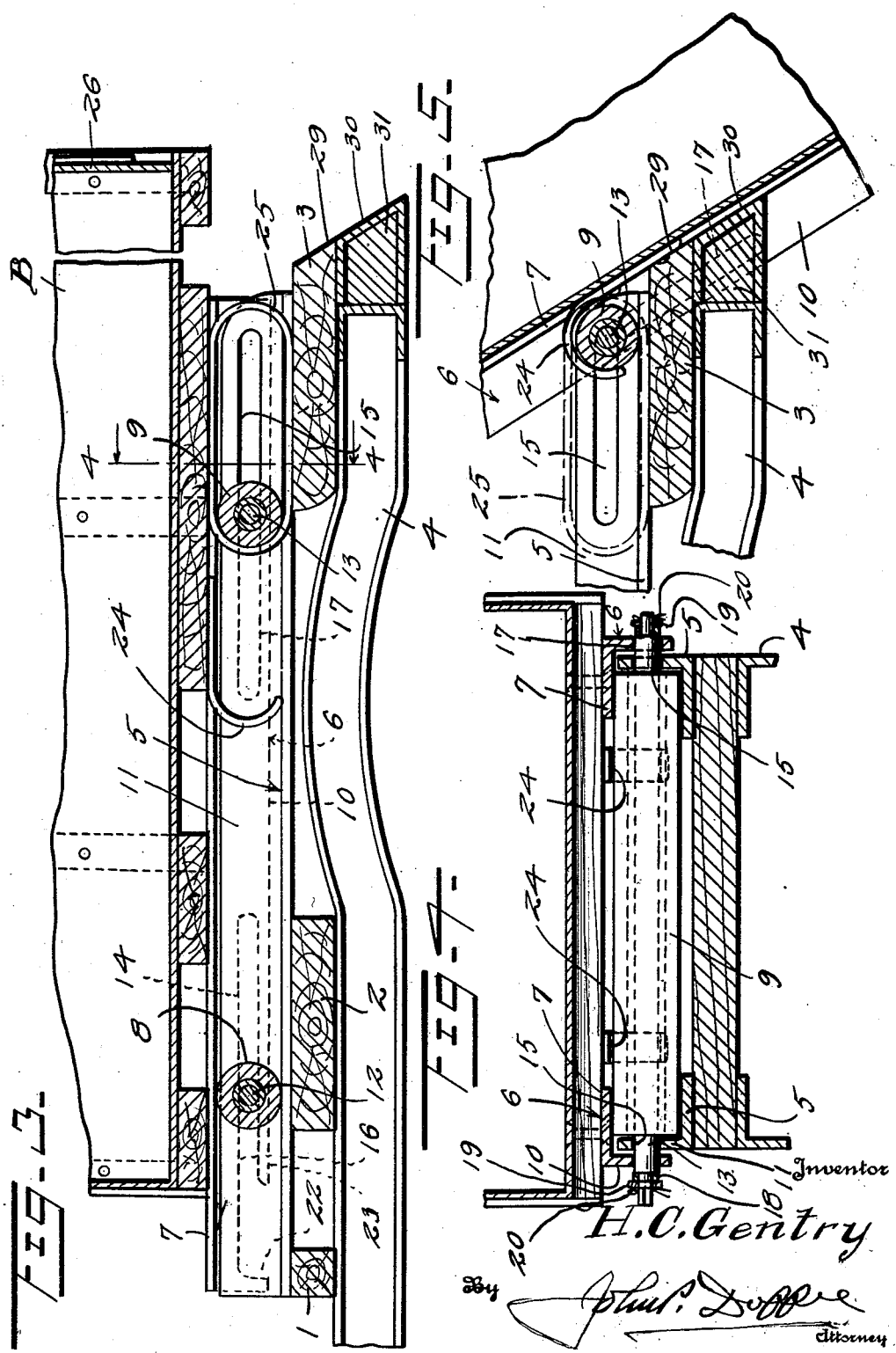

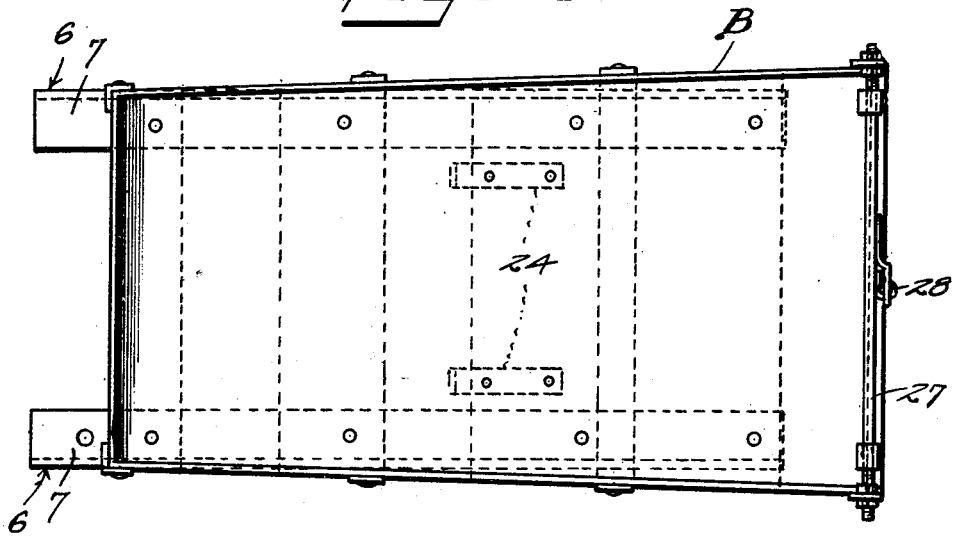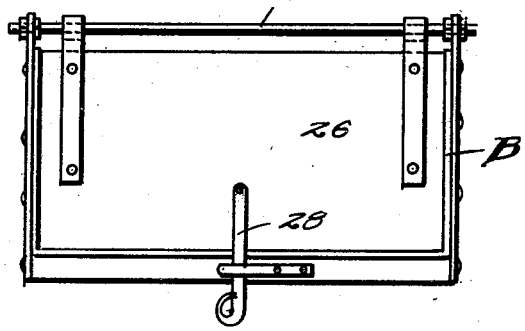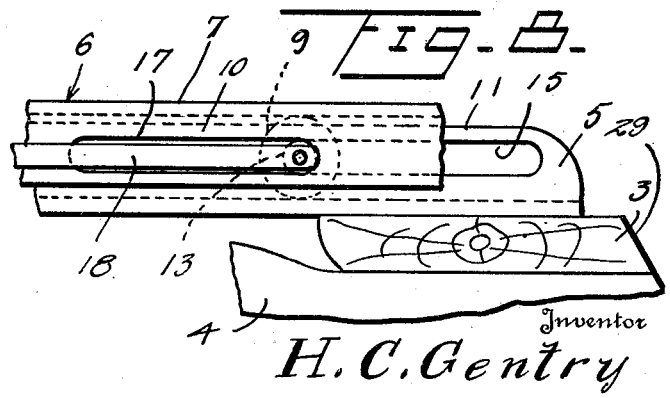

Patented Oct. 6, 1931

1,825,901

UNITED STATES PATENT OFFICE

HOUSTON C. GENTRY, OF SHERIDAN, ARKANSAS

ROLLER DUMP BODY FOR TRUCKS

Application filed April 6, 1929. Serial No. 353,030.

This invention relates to new and useful improvements in roller dump bodies for trucks and more particularly trucks of the Chevrolet type, that is to say, where the frame extends considerably beyond the rear axle.

Among the many advantages derived through the use of my invention, some of the more important may be briefly enumerated as follows:

First: The load on the truck is evenly balanced as it should be and this prevents breaking of the frame and abuse of the rear tires of the truck.

Second: The loading box or body is nearer the ground where it can be easily loaded by hand.

Third: The dump body may be easily and readily operated.

Fourth: The dump body may be used to great advantage in dumping dirt or other substance over a bank or precipice, as it is not necessary to back as near to the edge owing to the fact that the body rolls back two feet before dumping.

Fifth: The loading box cannot accidently dump while driving.

Sixth: The device is simple and economical in construction and sturdy, rigid and durable in use.

In the accompanying drawings, which are for illustrative purposes only and are therefore not drawn to scale—

Figure 1 is a side elevation of the rear portion of a truck frame with my improved dump body applied and in normal or loading position.

Figure 2 is a plan view, with the dump body proper removed.

Figure 3 is a vertical longitudinal sectional view of the rear portion of the truck frame and dump body.

Figure 4 is a vertical transverse section, taken on line 4—4 of Figure 3.

Figure 5 is a fragmentary sectional view, showing the dump body in dumping position.

Figure 6 is a top plan view of the dump body proper.

Figure 7 is a rear end view of Figure 6 and Figure 8 is a detail fragmentary elevation, showing the rear ends of the stationary and movable angle bars, rear roller and associated parts.

Referring to the drawings for a more particular description of my invention and in which drawings like parts are designated by like reference characters throughout the several views, A designates the rear end of a truck frame of the Chevrolet type and B my improved dump body.

In carrying out my invention, a series of cross beams 1, 2 and 3 are mounted on the truck frame 4 and provide supports for the stationary longitudinally disposed laterally spaced angle bars 5 arranged at opposite sides of the truck frame and extending to the extreme rear end thereof. Similar angle bars 6 are arranged with their horizontal portions 7 bearing on a pair of corresponding transverse front and rear supporting rollers 8 and 9 and their depending vertical portions 10 overlapping the upwardly extending vertical portions 11 of the angle bars 5. The ends 12 and 13 of the supporting rollers 8 and 9 extend through longitudinal slots 14 and 15 in the vertical members of the angle bars 5 and also through longitudinal slots 16 and 17 in the depending vertical members 10 of the angle bars 6. The ends of the bearing rollers are connected together by the longitudinal side bars 18, which may be held in place by the washers and cotter pins 19 and 20, respectively, or other equivalent means.

To dump the body, a crank 21 is applied to one end of the bearing roller 9 and turned by the operator until the body is rolled back as far as possible, when it will automatically dump itself. It will be noted that the bottom front walls of the slotted portions 16 of the depending vertical members of the angle bars 6, are recessed or cut away, as at 22, to facilitate the disengagement of the ends 12 of the front roller 8 with such slotted portions in dumping the body. It will be understood that the angle bars 6 are bolted or otherwise secured to the bottom of the dump body and the method above described of slotting and recessing the front ends of these angle bars, provide hooks 23 which extend under the ends of the front supporting roller 8 and prevent the loading box or body from accidently dumping while in transit.

A pair of hooks 24 are fastened to the bottom of the body and hook over the rear roller 9 when the body is dumped and oblong metal straps 25 are bolted or otherwise secured to the upper face of the cross beam 3 and assist in firmly supporting the rear roller under these conditions.

The body is provided with an end gate 26, which is hinged at its upper edge to the cross rod 27 and provided at the bottom with a suitable latch 28. The inclined rear edge 29 of the cross beam 3 and the inclined edge 30 of the wooden block 31, serve as bumpers for the bottom of the body when dumped.

From the foregoing description taken in connection with the drawings, it is thought that the construction and operation of my device will be readily understood without requiring a more extended explanation.

Various changes in the form, proportions and minor details of construction may be resorted to without departing from the principles or sacrificing any of the advantages of my invention as defined in the appended claims.

Having described my invention, what I claim as new and desire to secure by Letters Patent, is:

In combination with a truck frame, longitudinally slotted stationary angle bars fastended thereto, a dump body, longitudinally slotted angle bars fastened to the dump body and working over said stationary angle bars, front and rear supporting rollers for the dump body, said rollers arranged with their ends extending through the slots of the first and second mentioned angle bars, connecting bars for the ends of the supporting rollers, a crank handle for turning one of said rollers, a pair of hooks fastened to the bottom of the body and adapted to hook over the rear supporting roller when the body is in dumping position and oblong metal straps secured to the truck frame and serving as additional supporting means for the rear roller when the body is in dumping position.

In testimony whereof he affixes his signature.

HOUSTON C. GENTRY.